(12) United States Patent
Callan et al.

(10) Patent No.: US 7,647,262 B2
(45) Date of Patent: *Jan. 12, 2010

(54) TRANSACTION CONTROL SYSTEMS AND METHODS

(75) Inventors: James Callan, Dublin (IE); Colin Piper, Dublin (IE)

(73) Assignee: Oracle EMEA Limited (IE)

( * ) Notice: Subject to any disclaimer, the term of this patent is extended or adjusted under 35 U.S.C. 154(b) by 3 days.

This patent is subject to a terminal disclaimer.

(21) Appl. No.: 12/028,706

(22) Filed: Feb. 8, 2008

(65) Prior Publication Data

US 2008/0133263 A1    Jun. 5, 2008

Related U.S. Application Data

(63) Continuation of application No. 10/242,694, filed on Sep. 13, 2002, now Pat. No. 7,353,197, which is a continuation of application No. PCT/IE00/00029, filed on Mar. 14, 2000.

(51) Int. Cl.
*G06Q 40/00* (2006.01)
(52) U.S. Cl. .......................................... 705/35; 705/1
(58) Field of Classification Search ............. 705/35–45
See application file for complete search history.

(56) References Cited

U.S. PATENT DOCUMENTS

| 5,765,144 A | 6/1998 | Larche et al. |
| 5,933,816 A | 8/1999 | Zeanah et al. |

*Primary Examiner*—Richard C Weisberger
(74) *Attorney, Agent, or Firm*—Townsend and Townsend and Crew LLP

(57) ABSTRACT

A transaction control system generates presentation objects which reside on front-end terminals. The control system also comprises a business rules layer, a transaction layer, and an external interface layer. A transaction processing module is created by a control system generating a presentation object and transferring it to a relevant front-end terminal and also instantiating a business object, a transaction object, and an external interface object. Development of transaction processing modules is therefore very simple and the module is versatile and may be easily modified.

19 Claims, 4 Drawing Sheets

Payment Details for Amend

| | | | |
|---|---|---|---|
| Sort Code | 601212 | Account Number | 69000512 |
| Destination Sort Code | 204506 | DestinationAccount Number | 66582003 |
| Reference Number | | Payment Control Number | 1000036 |
| Beneficiary Name | Richard Lance x 4 nights | Payment Status | Unsigned |
| Currency | IEP ▼ | Amount | 2103.41 |
| | | Date | 06/10/1999 |
| Narrative | Camden Court Hotel | | |

Fig. 4

TRANSACTION CONTROL SYSTEMS AND METHODS

CROSS-REFERENCES TO RELATED APPLICATIONS

This application is a continuation of U.S. patent application Ser. No. 10/242,694, entitled "Transaction Control System," filed Sep. 13, 2002, which is a continuation of PCT application No. PCT/IE00/00029, filed on Mar. 14, 200, each of which is hereby incorporated herein by reference.

BACKGROUND OF THE INVENTION

The invention relates generally to transaction processing systems and to methods for generating such systems.

Embodiments of the invention relates in particular to transaction processing in environments in which there are very high volumes of transactions, such as for financial institutions. In such environments, there have traditionally been large mainframe back office systems which are generally very efficient at processing fixed length data fields and messages for transaction processing. Typically, these mainframe systems are connected to terminals in financial institution branches or other offices.

However, in recent years there has been an increasing requirement for ever more powerful front-end processing because there is a need to provide a large range of financial products is a versatile manner. These products include insurance services, life assurance services, and a wide range of different types of loan products and credit card processing services.

One solution to this problem is to provide a powerful distributed system in which processors and workstations are interconnected in a high-speed network. However, this is often not feasible because complete transfer over from the original host system is not practical, and in any event the highly efficient nature of the processing which is carried out by the host system is still required.

It is an object of the invention to provide a transaction control system to provide the front-end processing capacity required in such transaction processing environments, without sacrificing back-office processing efficiency.

Another object is to provide a method for developing transaction processing modules in a quick and versatile manner.

BRIEF SUMMARY OF THE INVENTION

According to the invention, there is provided a transaction control system comprising a presentation layer comprising means for generating presentation objects and for transferring the objects to a front end terminal, the presentation objects having code to direct capture of data, transfer of data to the control system, and output of data at the terminal. A business rules layer comprises business objects each comprising data and code implementing business rules, each business object being associated with a business transaction service comprising a plurality of transaction types. A transaction layer comprises transaction objects, each comprising means for performing bi-directional transfer of data and being associated with a transaction type. An external interface layer of the system comprises external interface objects, each of which is configured for communication with a transaction processing host.

In one embodiment, the presentation objects each comprise a communication manager for communication with business objects over a network interconnecting the control system and the front-end terminals. The presentation objects also comprise a plurality of panel controllers comprising means for handling and interpreting panel interaction events, and a plurality of panels controlled by the panel controllers for receiving and displaying transaction data.

Preferably, each presentation object comprises a dedicated panel controller associated with each panel.

In another embodiment, each presentation object further comprises at least one co-ordinator, the co-ordinator comprising means for coordinating display of a sequence of panels for a transaction type.

In a further embodiment, there is a one-to-many relationship between business objects and presentation object co-ordinators.

Preferably, there is a one-to-one relationship between transaction objects and presentation object co-ordinators, each being associated with a transaction type.

In another embodiment, each presentation object comprises means for utilising at least one model for defining data transfer between a co-ordinator and a business object.

In a further embodiment, the model comprises data and a mapping structure.

In the latter embodiment each model is an instance of a class instantiated by an associated business object on-the-fly.

According to another aspect, the invention provides a method for generating a transaction processing module operating with a front-end terminal and a host transaction processor. In the method, a transaction control system is provided that comprises means for communicating with the front-end terminal and the host. The control system generates a presentation object having code to direct capture of data, transfer of data to the control system, and output of data at the terminal. The control system transmits the presentation object to the front-end terminal. A business object comprising data and code implementing business rules are interactively selecting in the control system. The business object is associated with a business transaction service comprising a plurality of transaction types. A transaction object comprising means for performing bi-directional transfer of data and being associated with a transaction type is interactively selecting in the control system. An external interface object configured for directing communication with the host is also interactively selecting. The presentation, business, transaction, and external interface objects are then linked to provide a module.

Preferably, the presentation object comprises a plurality of panels, panel controllers for controlling display sequencing of the panels, and a coordinator for co-ordinating display of a sequence of panels for a transaction type.

In another embodiment, there is a single presentation object co-ordinator associated with each transaction object.

BRIEF DESCRIPTION OF THE DRAWINGS

The invention will be more clearly understood from the following description of some embodiments thereof, given by way of example only with reference to the accompanying drawings in which:

FIG. 4 is a sample of a screen of the system.

DETAILED DESCRIPTION OF THE INVENTION

Figure 1:
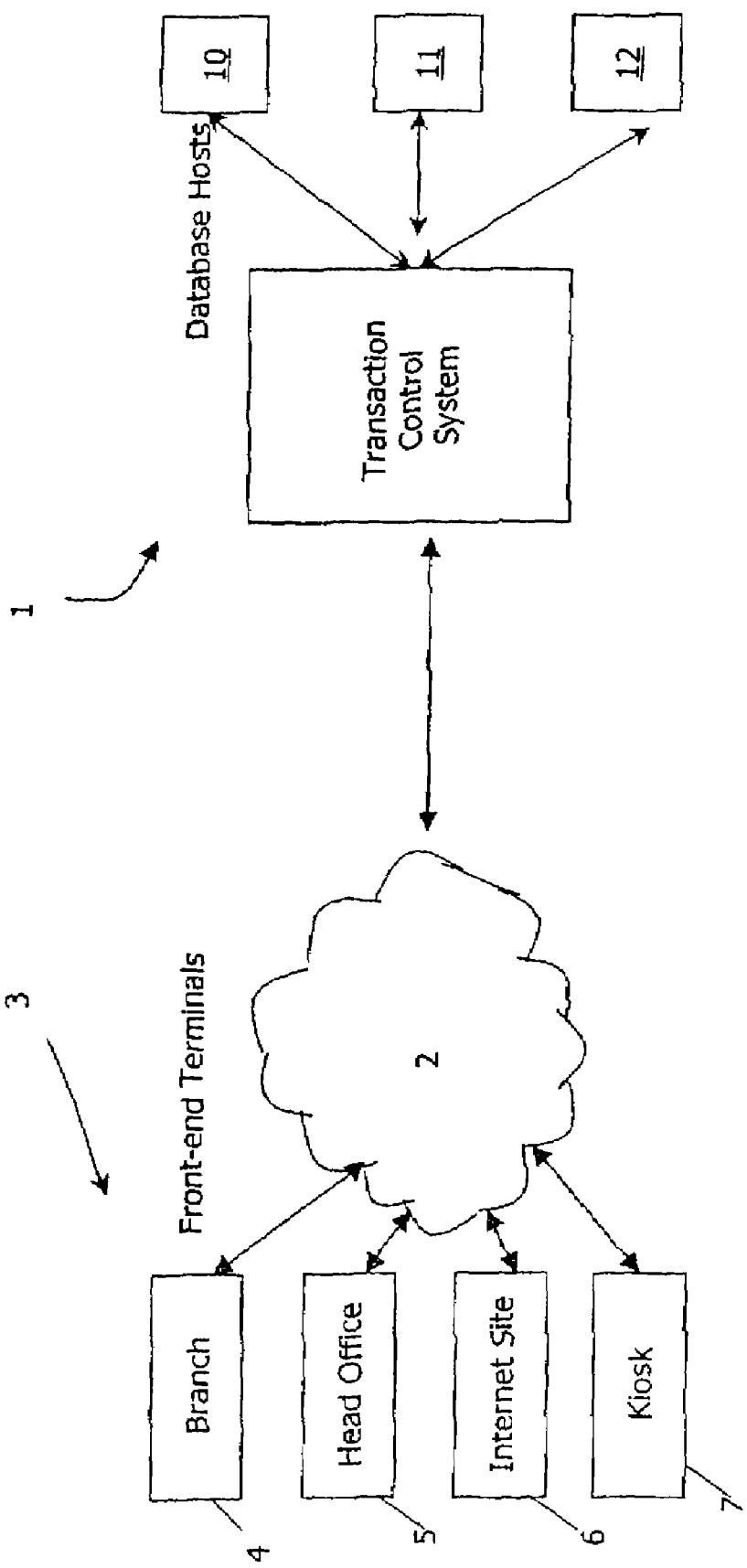
FIG. 1 is a diagrammatic representation of a network of data processing equipment illustrating the context of a transaction control system of the invention.

Referring to the drawings, and initially to FIG. 1 there is shown a transaction control system 1. The system 1 communicates by a network 2 with a number of front-end terminals 3. In this embodiment, the control system 1 is for use in a financial institution and the front-end terminals include a branch terminal 4, a head office terminal 5, an Internet site, 6, and a kiosk 7. The terminals 3 include processors and are capable of performing transaction processing at a capacity similar to that of a PC. The control system 1 is also connected to back-office database host systems 10, 11 and 12. These systems are of the traditional type and are typically mainframe systems which are particularly efficient at processing fixed length data fields for high volume transaction processing.

In the past, hosts such as the hosts 10, 11, and 12 have been connected to slave terminals for user interaction. The problem with this scenario is that there is very little flexibility in the manner in which business services can be provided to customers by organisations such as financial institutions. Therefore, the invention provides the transaction control system 1 with a view to providing flexibility which is required in the current business environment while at the same time maintaining the advantages of highly efficient processing provided by the database hosts 10, 11, and 12.

Figure 2:
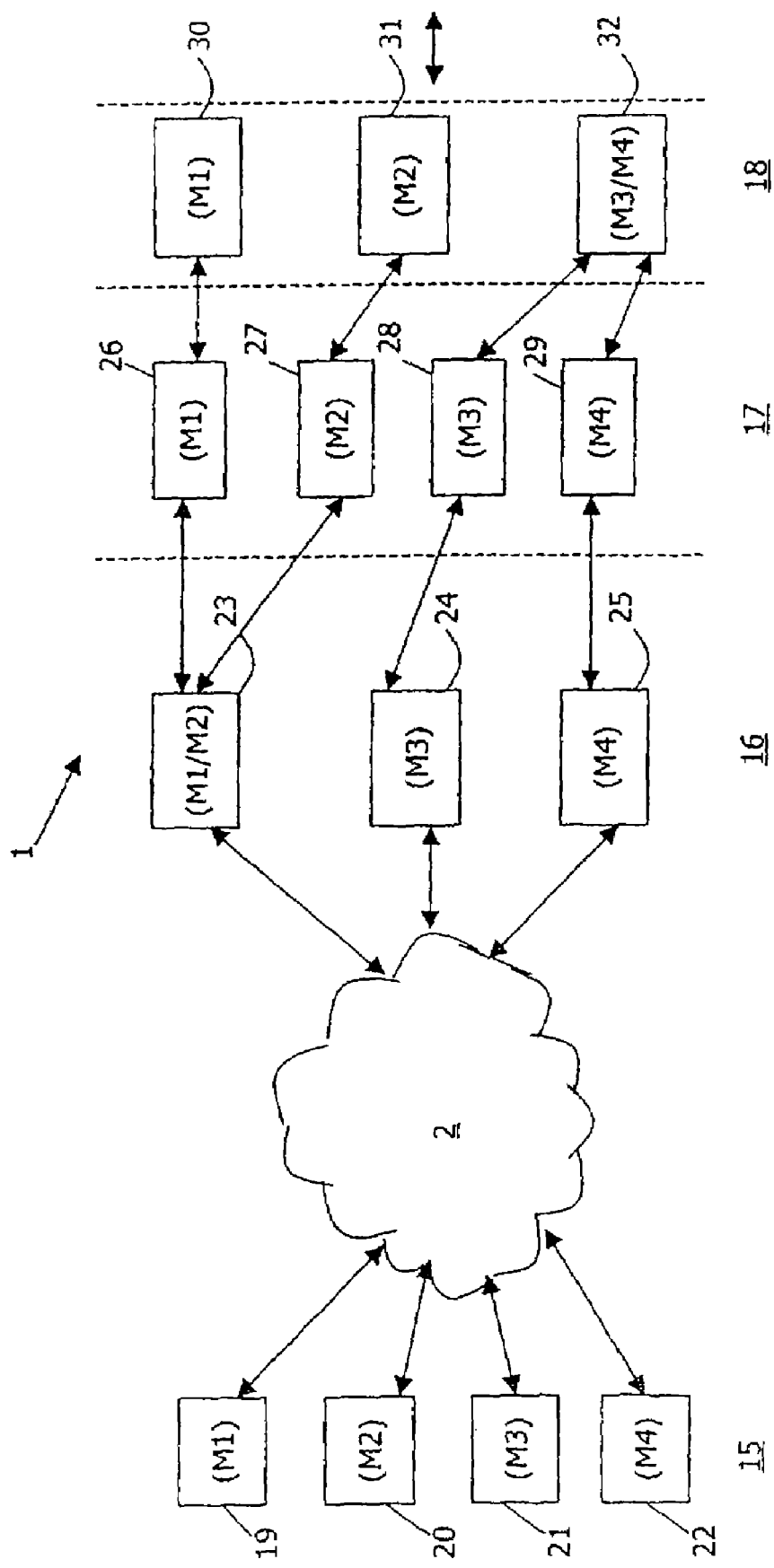
FIG. 2 is a diagrammatic representation showing operation of the control system.

Referring now to FIG. 2, the logical architecture for transaction processing is illustrated. This architecture comprises a number of modules indicated as M1, M2, M3 and M4. The underlying hardware is the set of database hosts, the control system 1, and the front-end terminals (which are typically PCs). The control system 1 is an enterprise class server, but may alternatively be a mainframe system.

The control system 1 comprises four layers of objects. As shown in FIG. 2, there is a presentation layer 15 of objects 19, 20, 21, and 22. These objects are generated by the control system 1 and are transmitted via the network 2 to the relevant front-end terminals 3. The architecture also comprises objects in three layers residing on the control system hardware. These are a business rules layer 16, a transaction layer 17, and an external interface layer 18. The business rules layer 16 comprises business objects 23, 24, and 25. The transaction layer 17 comprises transaction objects 26, 27, 28, and 29. The external interface layer 18 comprises external interface object 30, 31, and 32.

Briefly, to generate a transaction processing module for a particular business service, an object is selected from each of the four layers and communication threads are established between them to form the module. In the example shown in FIG. 2, a module M1 comprises a presentation object 19, a business object 23, a transaction object 26, an external interface object 30. A second module, M2, comprises a presentation object 20, the business object 23 (which is also part of the module M1), a transaction object 27, and an external interface object 31. Configuration of the modules M3 and M4 are likewise illustrated in FIG. 2 with the module names in parentheses.

Figure 3:
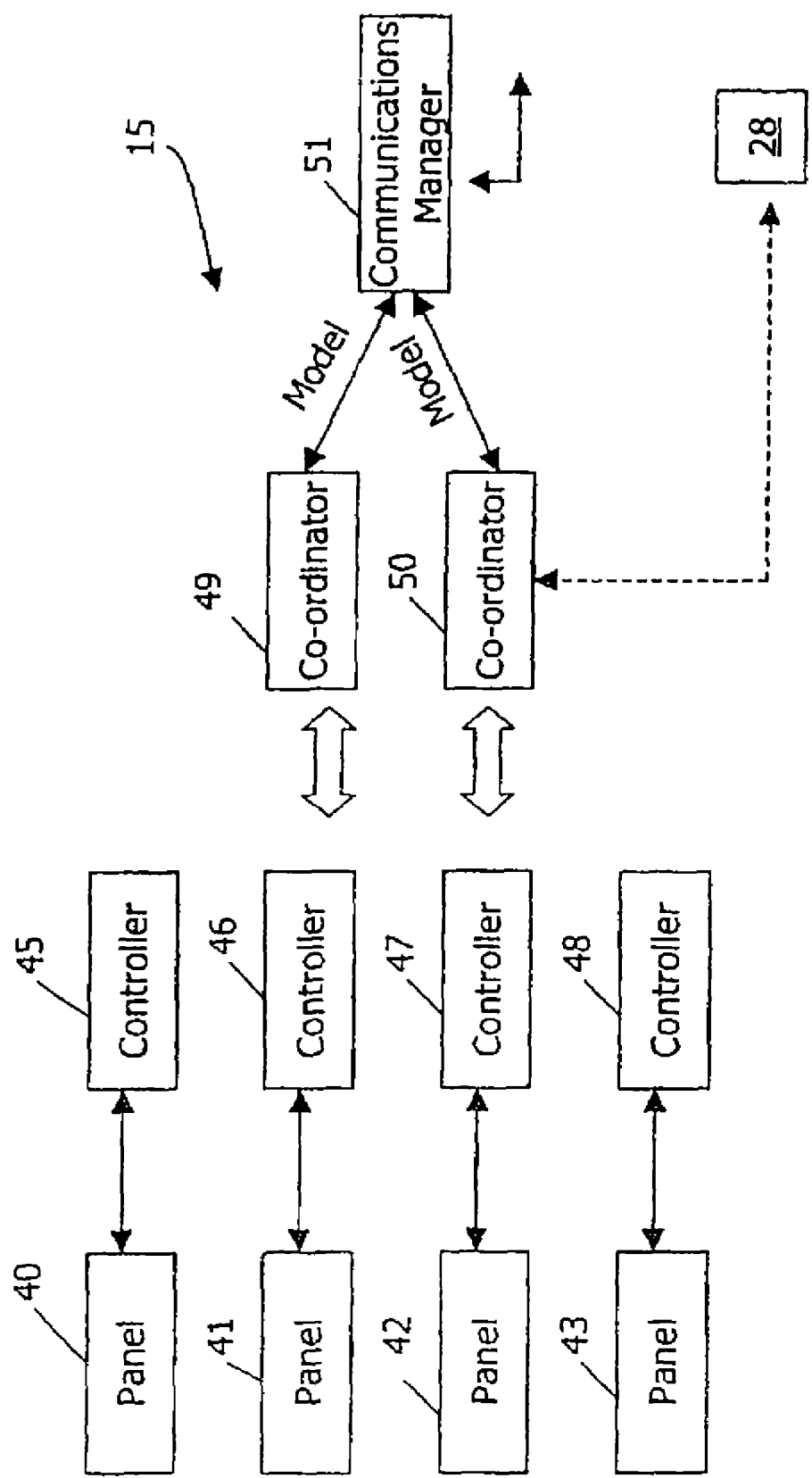
FIG. 3 is a more detailed diagram showing operation of a front-end terminal connected to the control system.

Referring now to FIG. 3, the configuration of a presentation object is described in more detail. Each presentation object 19, 20, 21, and 22 comprises a set of panels and in the example illustrated there are four panels 40, 41, 42, and 43. Each panel has a dedicated controller, and the four controllers are indicated by the numerals 45, 46, 47 and 48. Each presentation object comprises at least one co-ordinator and in the example shown there are two co-ordinators 49 and 50. Also, each presentation object comprises a communications manager 51.

Generally, each presentation object comprises code to direct capture of data, transfer of data to the business rules layer, and output of data at the relevant front-end terminal 3. The panels provide GUI screens with radio buttons, dropdown menus, and other user interactive displays. They are developed using a Java-based development tool. Each panel controller comprise code for handling and interpreting interfacing events at the associated panel.

Each coordinator controls the sequence of panels for a particular transaction type and is associated with that transaction type, such as processing a loan application. There is a one-to-one relationship between each coordinators and a transaction object in the transaction layer 17. For example, in the diagram of FIG. 3 the coordinator 50 is associated with the transaction object 28 as indicated by interrupted line. On the other hand, each business object relates to a range of transaction types to form a complete business service for an individual transaction processing module M1 to M4.

The communications manager 51 provides middleware communication protocol control, such as Http, Https, IIOP, and RMI.

Communication between each coordinator 49 and 50 and the communications manager 51 is set according to a model which is generated on-the-fly by the relevant business object for the module. The model includes data and a mapping structure for transfer of information bi-directionally. Each model is therefore associated with a particular transaction type.

Regarding the business objects, these are templates which are instantiated and comprise data and behaviour code which implement rules for a particular business service. The behaviour code sets the delivery channels and creates the presentation object and the models for data transfer. As stated above, each business object also generates the model on-the-fly in real time for transaction processing. For instance, the presentation object may submit an update to the business object. The presentation object (perhaps running on an Internet Browser) transfers the data model to the business object, which examines and validates the contents of the data before generating the fixed-length data transaction and transmitting the transaction to the associated host via the layers 17 and 18.

An important aspect of the business objects is that they comprise a large degree of pre-defined template code and are instantiated for a particular service. For example, the control system may initially comprise a set of business object templates relating to services such as head office administration processing or kiosk processing. To generate a particular module for a business service, the business object is instantiated and any necessary additional code is added. This object is then capable of generating the required presentation object for the module and it interfaces as defined during the generating stage with a particular transaction object, which in turn interfaces with a particular external interface object.

Each transaction object comprises Java™ components for data transfer and on the back office side communicates with fixed-length data fields. As stated above, there is a one-to-one relationship between each transaction object and a co-ordinator in a presentation object as each relates to a particular transaction type. Of course, if a different presentation object also handles the same transaction type, it also will have a coordinator associated with the same transaction object.

The external interface objects 30, 31, and 32 provide services similar to those provided by the communications manager 51 of the presentation object. They allow communication according to the desired protocol for the associated host such as the IBM Cics™ or MQ Series™ protocols. The external interface objects also provide integration with groupware and desk top applications and interface with separate existing systems.

To illustrate the functions performed by the various objects, the following is an example of a generic process sequence for an enquiry update transaction type.

The user selects/enters the account and payment in the GUT.

The panel coordinator 49 generates the data model required to return the payment details and sends it to the business object. This includes the key identifying elements, account number, and payment control number.

The business object retrieves the payment information, builds the data model, and returns it to the panel coordinator 49 client.

The panel co-ordinator 49 displays the current information on the screen (as shown in FIG. 4) and enables the user to update it. The user can modify the appropriate elements of the payment, and the panel co-ordinator transmits the modified information to the business object for update.

The business object examines the modified information, confirms that it is valid, generates the update transaction and transmits it to the host system via the layers 17 and 18.

The business object examines the response from the host, and returns an appropriate message to the panel co-ordinator 49.

The business object writes the audit trail.

This sequence of events is a particular transaction type and has a dedicated co-ordinator 49 in a presentation object and a dedicated transaction object. The code for this generic sequence of events is set by templates for generating the relevant objects and so relatively little coding is required for particular modules. Using this type of information, an object in the business rules layer 16 is selected and subsequently one or more objects in each of the others layer is also selected.

The following is an example of a module for handling interest rate updates on a host system.

| Layer | Objects |
|---|---|
| Presentation | InterestRateView |
| Business Rules | InterestRate |
| Transaction | InterestRateEnquiryTxn |
| | InterestRateUpdateTxn |
| External Interface | ConnectorCICS |
| | Connector DB2 |

In another example, the following is the sequence. Firstly, the user enters information into the client panel and clicks the "OK" button to submit a request. The front-end framework formats this data as a collection of key-pairs, possibly in XML format, and transmits this collection of data to an application server, using an appropriate protocol (Http, Https, RMI, IIOP are common protocols). The client request is sent to a Servlet on a Web server. This Servlet interprets the data, which carries a request ID. The Servlet carries out a look-up to find the business object that provides the required functionality, namely a banking service object. It then generates a request to this banking service object on an EJB Container. This object carries out the business process, and generates requests to the business objects that it needs.

In turn, the business objects identify the data requirements (retrievals and updates) and generate the appropriate requests to the external interface objects. The EJB objects are independent of the communication protocol, and of the distributed naming service. A typical module uses the IIOP communication protocol and the JNDI naming service.

The external interface objects communicate with the host system across the available middleware channel (possibly MQ Series™, CICS™ or Tuxedo™) using the request formats that are available on the host system. The external interface objects may also retrieve data from mid-tier databases, typically using JDBC connections.

It will be appreciated that the invention provides a method for developing a transaction processing module in a very fast and effective manner. All that is required is that one or more objects in each layer is instantiated and completed with code for the particular requirements. It will also be appreciated that the control system operates in a versatile manner to allow simple modification of its structure according to changing business requirements.

The invention is not limited to the embodiments described but may be varied in construction and detail within the scope of the claims.

What is claimed is:

1. A computer-implemented method of providing business services to a plurality of client processing devices, comprising:

under control of one or more computing devices,
generating a presentation object and transferring the presentation object to a client processing device having sent a request corresponding to a transaction for one of the business services, the presentation object including code for capturing and transferring transactional data;
generating a business object implementing business rules for processing the transaction and applying the business rules to process the transaction, the corresponding business service being associated with a plurality of transaction types;
generating a transaction object for performing bi-directional transfer of transactional data associated with a transaction type;
generating an external interface object for communicating the transactional data with one of the at least one database host system; and
utilizing the presentation object on the client processing device with the business object, transaction object, and external interface object to enable the transaction for the business service between the client processing device and the at least one database host system.

2. A computer-implemented method according to claim 1, wherein generating a business object in the transaction control system further includes instantiating a template for the corresponding business service.

3. A computer-implemented method according to claim 1, wherein the presentation object includes a plurality of user interface panels each with a dedicated controller and at least one communication management function for directing capture of data from a user of the client processing device and interpreting interfacing events for each panel.

4. A computer-implemented method according to claim 3, wherein the presentation object further comprises at least one coordinator comprising means for coordinating display of a sequence of panels for a transaction type.

5. A computer-implemented method according to claim 4, further comprising ensuring a one-to-many relationship between business objects and presentation object coordinators.

6. A computer-implemented method according to claim 4, further comprising ensuring a one-to-one relationship between transaction objects and presentation object coordinators, each being associated with a transaction type.

7. A computer-implemented method according to claim 4, wherein the presentation object further comprises means for utilizing at least one data transfer mechanism for defining data transfer between a coordinator and the business object.

8. A computer-implemented method according to claim 7, wherein the data transfer mechanism comprises data and a mapping structure.

9. A computer-implemented method according to claim 8, wherein each data transfer mechanism is an instance of a class instantiated by an associated business object on-the-fly.

10. A computer-implemented method of providing business services to a plurality of client processing devices, comprising:
under control of one or more computing devices,
receiving a request from a client processing device corresponding to a transaction for one of the business services; and
enabling the transaction for the business service between the client processsing device and at least one database host system using a presentation object, a business object, a transaction object, and an external interface object,
wherein the presentation object resides on the client processing device and includes instructions for capturing and transferring transactional data,
wherein the business object includes instructions for implementing business rules for processing the transaction and applying the business rules to process the transaction, the corresponding business service being associated with a plurality of transaction types;
wherein the transaction object includes instructions for performing bi-directional transfer of transactional data associated with a transaction type, and
wherein the external interface object includes instructions for communicating the transactional data with one of the at least one database host system.

11. A computer program product embedded in a computer readable medium for providing business services to a plurality of client processing devices, the program product comprising instructions that, when executed by a processor, cause the processor to:
generate a presentation object and transfer the presentation object to a client processing device having sent a request corresponding to a transaction for one of the business services, the presentation object including code for capturing and transferring transactional data;
generate a business object implementing business rules for processing the transaction and applying the business rules to process the transaction, the corresponding business service being associated with a plurality of transaction types;
generate a transaction object for performing bi-directional transfer of transactional data associated with a transaction type;
generate an external interface object for communicating the transactional data with one of at least one database host system; and
utilize the presentation object on the client processing device with the business object, transaction object, and external interface object to enable the transaction for the business service between the client processing device and the at least one database host system.

12. A computer program product according to claim 11, wherein the instructions for generating a business object in the transaction control system further include instructions for instantiating a template for the corresponding business service.

13. A computer program product according to claim 11, wherein the presentation object includes a plurality of user interface panels each with a dedicated controller and at least one communication management function for directing capture of data from a user of the client processing device and interpreting interfacing events for each panel.

14. A computer program product according to claim 13, wherein the presentation object further comprises at least one coordinator comprising means for coordinating display of a sequence of panels for a transaction type.

15. A computer program product according to claim 14, further comprising instructions for ensuring a one-to-many relationship between business objects and presentation object coordinators.

16. A computer program product according to claim 14, further comprising instructions for ensuring a one-to-one relationship between transaction objects and presentation object coordinators, each being associated with a transaction type.

17. A computer program product according to claim 14, wherein the presentation object further comprises means for utilizing at least one data transfer mechanism for defining data transfer between a coordinator and the business object.

18. A computer program product according to claim 17, wherein the data transfer mechanism comprises data and a mapping structure.

19. A computer program product according to claim 18, wherein each data transfer mechanism is an instance of a class instantiated by an associated business object on-the-fly.

* * * * *

UNITED STATES PATENT AND TRADEMARK OFFICE
CERTIFICATE OF CORRECTION

| | |
|---|---|
| PATENT NO. | : 7,647,262 B2 |
| APPLICATION NO. | : 12/028706 |
| DATED | : January 12, 2010 |
| INVENTOR(S) | : James Callan et al. |

It is certified that error appears in the above-identified patent and that said Letters Patent is hereby corrected as shown below:

On sheet 4 of 4, in Figure 4, line 4, delete "Mumber" and insert -- Number --, therefor.

In column 7, line 21, in claim 10, delete "processsing" and insert -- processing --, therefor.

In column 8, line 8, in claim 11, after "of" insert -- the --.

Signed and Sealed this

Nineteenth Day of October, 2010

David J. Kappos
*Director of the United States Patent and Trademark Office*